INVENTOR.
SAM P. RAGSDALE
BY Harry A. Herbert Jr
ATTORNEY

Richard J. Killoran
AGENT

INVENTOR.
SAM P. RAGSDALE
BY Harry A. Herbert Jr.
ATTORNEY

Richard J. Killoren
AGENT

April 22, 1969 S. P. RAGSDALE 3,440,411
GAS WEIGHT FLOW COMPUTER FOR PROVIDING THE
RATIO OF TWO PRESSURES
Original Filed Nov. 6, 1962 Sheet 5 of 7

Fig-10

INVENTOR.
SAM P. RAGSDALE
BY Harry A. Herbert Jr
ATTORNEY

Richard J. Killoren
AGENT

Fig. 11

3,440,411
GAS WEIGHT FLOW COMPUTER FOR PROVIDING THE RATIO OF TWO PRESSURES
Sam P. Ragsdale, 1125 Potter Blvd.,
Tullahoma, Tenn. 37388
Original application Nov. 6, 1962, Ser. No. 235,694.
Divided and this application Mar. 30, 1966, Ser. No. 538,932
Int. Cl. G06g 7/57
U.S. Cl. 235—151.34    1 Claim

ABSTRACT OF THE DISCLOSURE

A device for providing the ratio of two pressures has a pair of substantially equal resistance elements connected in series. One resistor is connected to the movable tap on one pressure potentiometer and the other resistor is connected to the movable tap of a second pressure potentiometer. The lower end of the two potentiometers are connected at ground potential. A reference voltage is connected to the ungrounded terminal of the first potentiometer. An operational amplifier, having an infinite gain and an infinite input impedance, has its input connected to the junction between the two resistance elements and its output connected to the ungrounded end of the second potentiometer.

---

This invention relates to a device for providing a continuous, on-line solution to the theoretical gas flow equation, and is a division of application Ser. No. 235,694, filed Nov. 6, 1962.

One object of the invention is to provide a gas weight flow computer capable of operation remote from where the flow is measured.

Another object is to provide a gas weight flow computer wherein the solution is in the form of an electrical voltage suitable for application to indicators, recorders or automatic control systems.

These and other objects will be more fully understood from the following detailed description taken with the drawing wherein.

Figure 1:
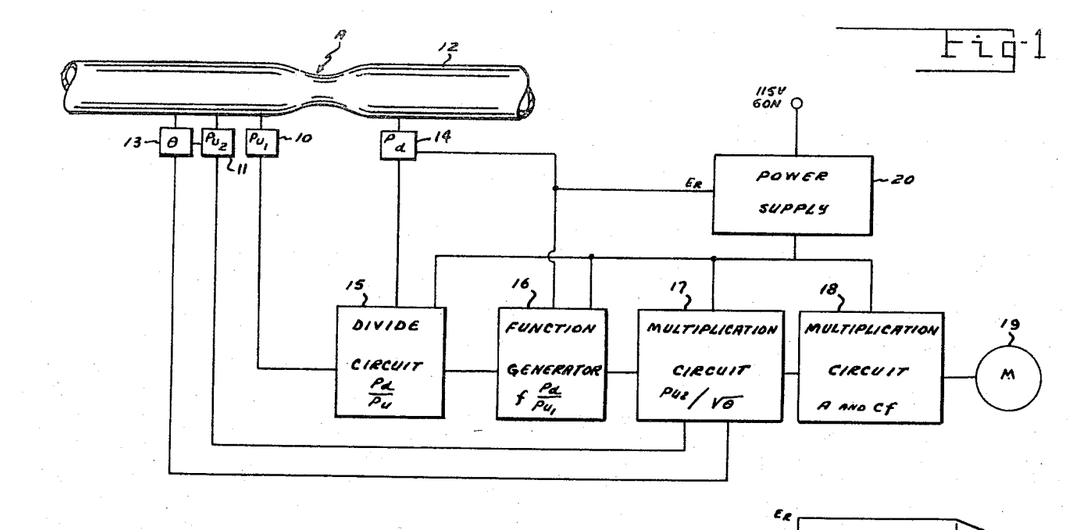
FIG. 1 shows a schematic block diagram of gas weight flow computer system according to the invention.

With reference to FIG. 1 of the drawing, the theoretical gas weight flow for the flow of gas through a restriction of area A is given by the following expression:

$$W_t = \frac{2\gamma M g}{R(\gamma-1)}^{1/2} \frac{P_u A}{\sqrt{\theta}} F\left(\frac{P_d}{P_u}\right) \quad (1)$$

where:

$\theta$=temperature (° R.)
$P_u$=pressure upstream of restriction, (p.s.i.a.)
$P_d$=pressure downstream of restriction, (p.s.i.a.)
A=cross-sectional area of restriction, (sq. in.)
R=universal gas constant, (1544 lb.-ft./mole-° R.)
g=acceleration of gravity, (32.3 ft./sec.²)
$\gamma$=ratio of specific heats, $(C_p/C_v)$
M=molecular weight of gas, (lb./mole)

$$F\left(\frac{P_d}{P_u}\right) = \left[\left(\frac{P_d}{P_u}\right)^{\frac{2}{\gamma}} - \left(\frac{P_d}{P_u}\right)^{\frac{\gamma+1}{\gamma}}\right]^{1/2} \quad (2)$$

when $$\left(\frac{2}{\gamma+1}\right)^{\frac{\gamma}{\gamma-1}} < \frac{P_d}{P_u} < 1$$

$$F\left(\frac{P_d}{P_u}\right) = \left[\left(\frac{2}{\gamma+1}\right)^{\frac{2}{\gamma-1}} - \left(\frac{2}{\gamma+1}\right)^{\frac{\gamma-1}{\gamma+1}}\right]^{1/2} \quad (3)$$

when $$0 \frac{P_d}{P_u} \leq \left(\frac{2}{\gamma+1}\right)^{\frac{\gamma}{\gamma-1}}$$

The function is made somewhat simpler if it is normalized by writing a new function:

$$f\left(\frac{P_d}{P_u}\right) = \frac{F\left(\frac{P_d}{P_u}\right)}{F\left(\frac{2}{\gamma+1}\right)^{\frac{\gamma}{\gamma-1}}} \quad (4)$$

The actual flow, $W_{actual}$, may be determined from the theoretical flow, $W_{theoretical}$, equation by use of the proper flow coefficient, $C_f$.

$$W_{actual} = W_{theoretical} \quad (5)$$

for a restriction having an insentropic inlet, $C_f$ is ideally equal to one ($C_f=1$). For well designed and known contour inlets $C_f$ may be calculated by determining the effect of flow angularity and the effective reduction in throat area due to boundary layer. However, $C_f$ would normally be determined experimentally for small area restrictions (less than 12 square inches) and for larger areas data would be extrapolated. The procedure would be to compare the actual flow as measured with a standard to the flow indicated by the Gas Weight Flow Computer with $C_f$ set equal to 1. Then $C_f$ would be the ratio of actual gas weight flow to theoretical gas weight flow.

Figure 2:
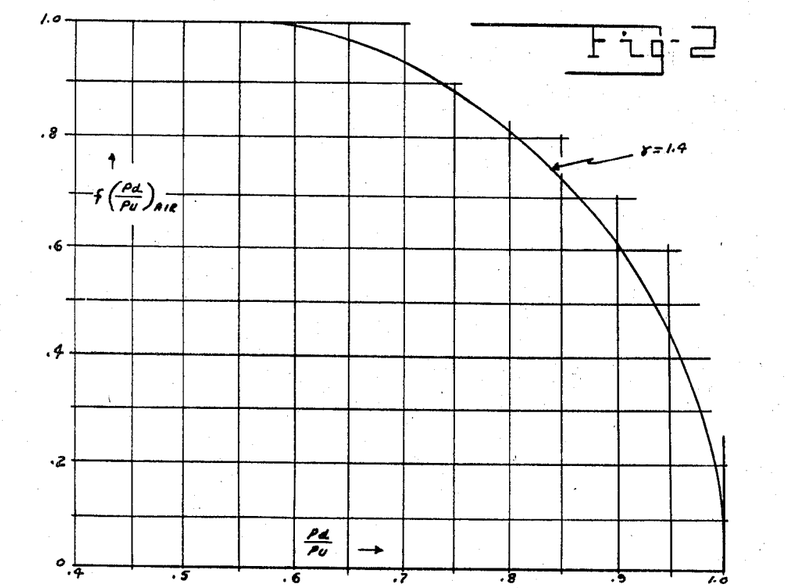
FIG. 2 shows the plot of $f(P_d/P_u)$ as a function of the pressure ratio $P_d/P_u$ for air.

The function $f(P_d/P_u)$ may be determined for each gas and is shown in FIG. 2 for air ($\gamma=1.4$).

The quantity involving $\gamma$, M, g and R is constant for each gas so that the actual weight flow equation may be written:

$$W = C_t K \frac{P_u A}{\sqrt{\theta}} f\left(\frac{P_d}{P_u}\right) \quad (6)$$

where $$K' = \left(\frac{2M\gamma g}{R(\gamma-1)}\right)^{1/2} \text{ and } K = K'\left[F\left(\frac{2}{\gamma+1}\right)^{\frac{\gamma}{\gamma-1}}\right] \quad (7)$$

with the values for K and $\gamma$ for various gases given in the following table:

| Gas | $\gamma$ | K |
|---|---|---|
| $N_2$ | 1.40 | .523 |
| Air | 1.40 | .532 |
| $O_2$ | 1.40 | .560 |
| Ar | 1.67 | .663 |
| $CO_2$ | 1.30 | .630 |

Figures 3, 8:
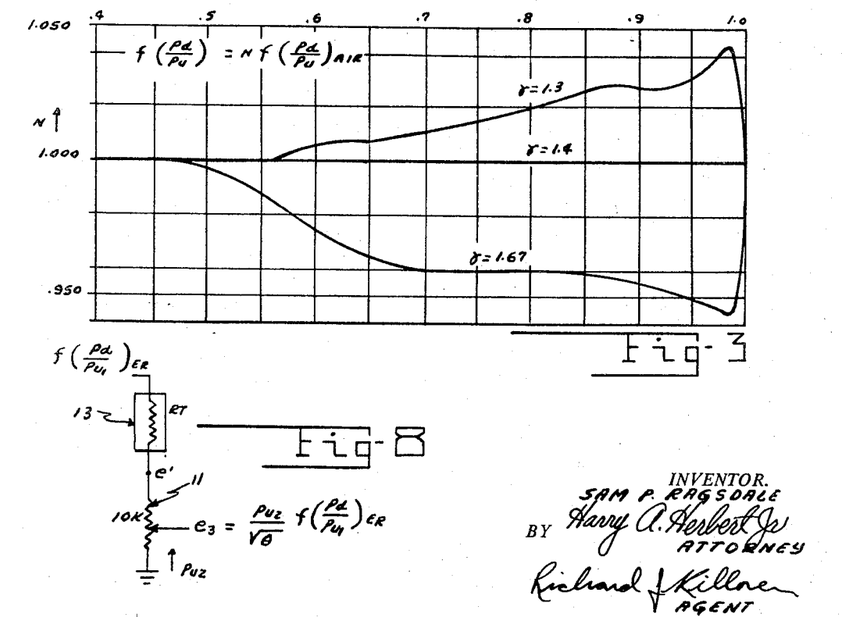
FIG. 3 shows the plot for N as a function of $P_d/P_u$ for various values of $\gamma$.
FIG. 8 shows the first multiplication circuit of the device of FIG. 1.

The function $f(P_d/P_u)$ for these gases may be determined from the following expression:

$$f\left(\frac{P_d}{P_u}\right)_{gas} = Nf\left(\frac{P_d}{P_u}\right)_{air} \quad (8)$$

where N for the various gases may be obtained from FIG. 3 with reference to the table given above.

The sequence of mathematical operations performed by the computer is shown in FIG. 1. Pressure transducers 10 and 11 sense the pressure upstream of the restriction A in duct 12. The temperature upstream is sensed by a temperature sensing means 13, such as a temperature sensitive resistance element. The downstream pressure is sensed by a pressure transducer 14. Pressure transducers 10, 11 and 14 are potentiometer-type pressure transducers.

The first operation performed in the computer is the determination of the pressure ratio $P_d/P_{u1}$ in the divide circuit 15 as will be explained later. The output of the divide circuit is applied to a function generator 16 to provide an output as a function of pressure ratio $P_d/P_{u1}$ as shown in FIG. 2. The output of the function generator is applied to multiplication circuit 17 to provide the multiplication by $$\frac{P_{u2}}{\sqrt{\theta}}$$

by use of pressure transducer 12 and temperature sensor 13. The output of multiplication circuit 17 is applied to multiplication circuit 18 to provide multiplication by A and $C_t$. The output of the second multiplication circuit 18 is applied to a utilization device shown as a meter 19. Power for the various elements is supplied by a power supply 20 which has a 115 volt, 60 cycle input.

Figure 4:
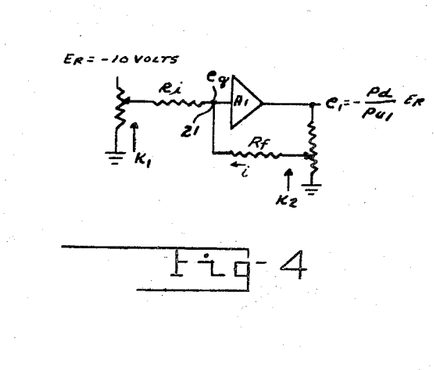
FIG. 4 shows a circuit schematic for the divide circuit of FIG. 1.
Figure 5:
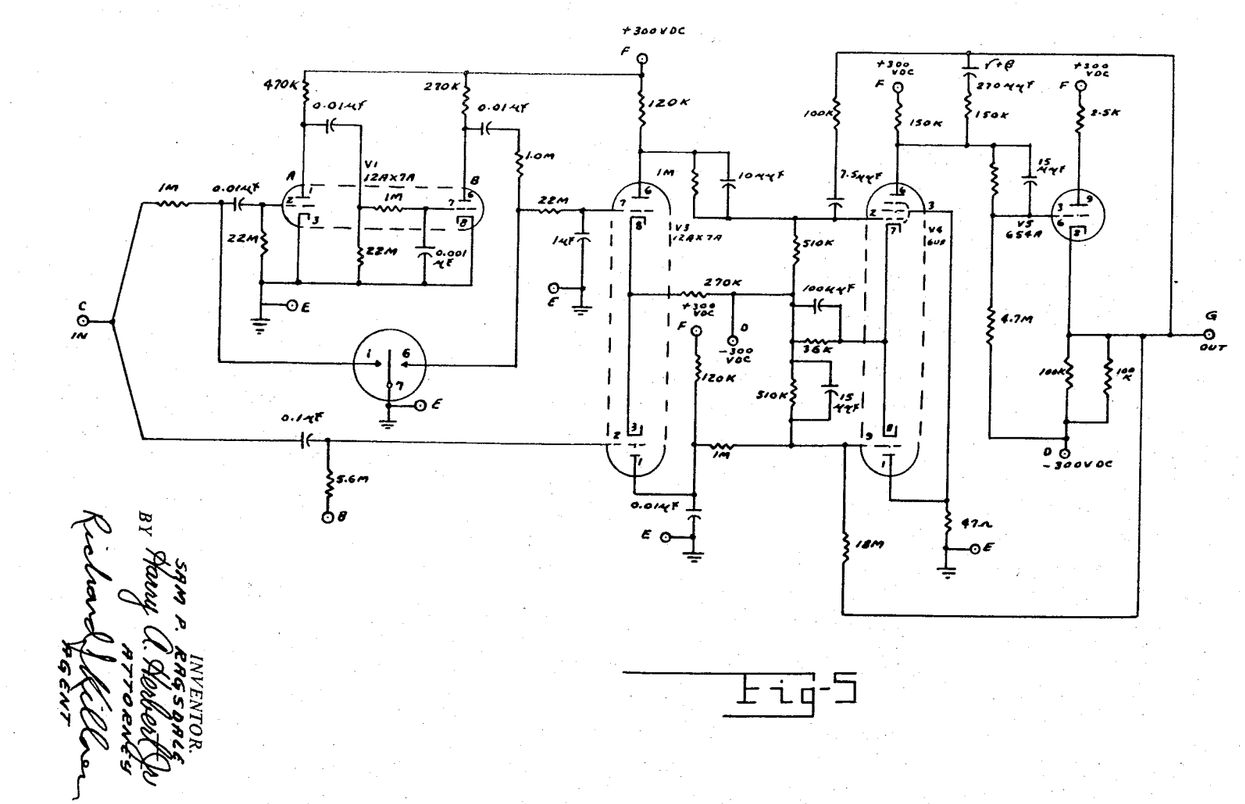
FIG. 5 shows a circuit schematic for an amplifier which may be used for the amplifiers in the device of FIG. 1.

To provide the pressure ratio $P_d/P_{u1}$ an operational amplifier is used with the pressure transducers 10 and 14 in the manner shown in FIG. 4. The amplifier $A_1$, used, is powered by an electronically regulated power supply, it is chopper stabilized and has an output range ±100 volts. It has an infinite gain, infinite input impedance and practically zero output impedance. One such amplifier is shown in FIG. 5 which is the circuit schematic for the Philbrick Universal Stabilized Amplifier Model USA–3. Assuming infinite gain and infinite input impedance the following equation can be written for the circuit of FIG. 4:

$$-K_1 E_R - iR_i - iR_f - K_2 e_1 = 0 \quad (9)$$

from which $$i = -\frac{K_1 E_R + K_2 e_1}{R_i + R_f} \quad (10)$$

Since we have assumed infinite gain in the amplifier, the voltage, $e_g$, at the summing junction 21 must be zero. Thus, $$-K_1 E_R - iR_i = 0 \quad (11)$$

Substituting $i$ from Equation 10 into Equation 11:

$$e_1 = \frac{K_1}{K_2} \frac{R_f}{R_i} E_R \quad (12)$$

$K_1$ and $K_2$ represent the percent of resistance from the ends of the pots to the wipers. This can be expressed as the ratio of pressure to full-scale pressure of the pot. Thus, $$K_1 \equiv \frac{P_d}{P_{d0}} K_2 \equiv \frac{P_{u1}}{P_{u0}}$$

If we let $P_{d0} = P_{u0}$ and $R_i = R_f$, Equation 12 reduces to $$e_1 = \frac{P_d}{P_u} E_R \quad (13)$$

Figure 6:
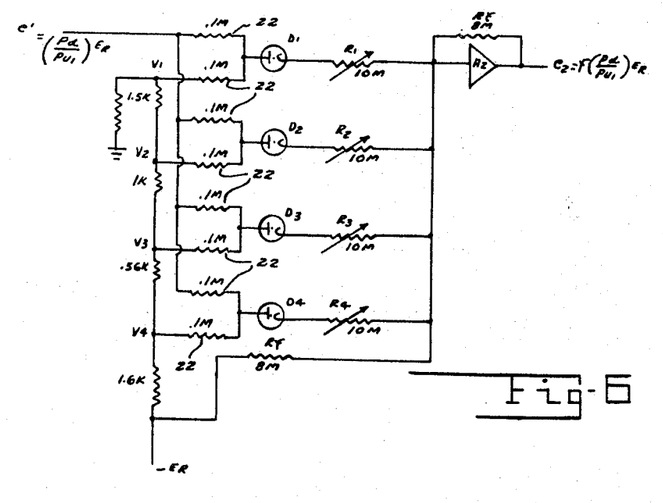
FIG. 6 is a circuit schematic for the function generator of the device of FIG. 1.
Figure 7:
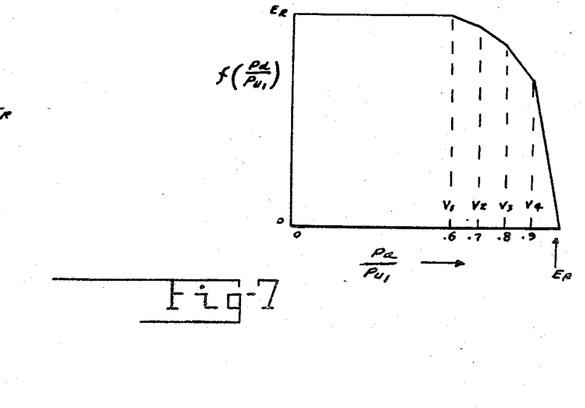
FIG. 7 shows the output $f(P_d/P_{u1})$ as a function of pressure ratio for the device of FIG. 6.

The pressure ratio signal $P_d/P_{u1}$ is applied to the function generator shown in FIG. 6 wherein the function $f(P_d/P_{u1})$ is generated in segments as shown in FIG. 7. The curve shown in FIG. 7 is an approximation of the curve shown in FIG. 2.

When the pressure ratio is one, $e_1$ has the value $E_R$. For ratios less than one it has a value less than $E_R$. The .1 meg. resistors 22 form summing junctions at the anodes of each of the diodes $D_1$, $D_2$, $D_3$ and $D_4$. The bias voltages $V_1$, $V_2$, $V_3$ and $V_4$ are negative and keep the diodes from conducting until $e_1$ exceeds each of these levels. The bias voltages are derived from a voltage divider circuit which has the voltage $E_R$ applied to it. $R_1$, $R_2$, $R_3$ and $R_4$ are slope adjustment resistors. The break-point of each segment is fixed by the bias voltages and the slope can be adjusted over a range to closely fit the functions of common gases.

The amplifier $A_2$ may also be an amplifier of the type shown in FIG. 5.

For small pressure ratios, the restriction is choked, $e_1$ is small, the diodes are biased off, and the output voltage, $e_2$ is $E_R$.

$$e_2 = -\frac{R_f}{R_f}(-E_R) = E_R \quad (14)$$

As the pressure ratio increases ($e_1 > |V_1|$), diode $D_1$ starts to conduct and the slope of the first segment is $$1/2(-R_f/R_1)$$

As the pressure ratio increases further ($e_1 > |V_2|$) diode $D_2$ starts to conduct giving a new slope of $$-1/2(R_f/R_1 + R_f/R_2)$$

The same procedure is repeated until all the diodes conduct. Thus the output $$e_2 = f\left(\frac{P_d}{P_{u1}}\right) E_R$$

The accuracy of the generated function can be increased by increasing the number of diode segments. Also, the flexibility of the function generator may be increased by making the bias voltages $V_1$, $V_2$, $V_3$ and $V_4$ adjustable. This is not necessary in most cases, however.

The output $e_2$ of the function generator is connected to $P_{u2}$ pressure transducer 11 through a temperature sensitive resistor $R_T$ as shown in FIG. 8.

Assuming no load on the wiper of the $P_{u2}$ pressure transducer 13 the voltage at $e'$ is:

$$e' = \left(\frac{10K}{R_T + 10K}\right) f\left(\frac{P_d}{P_{u1}}\right) E_R \quad (15)$$

and the voltage $$e_3 = \frac{P_{u2}}{P_{u0}} \left(\frac{10K}{R_T + 10K}\right) f\left(\frac{P_d}{P_{u1}}\right) E_R \quad (16)$$

The change in $R_T$ with temperature is such that the factor $$\left(\frac{10K}{R_T+10K}\right)$$

approximates $1/\sqrt{\theta}$ over a large temperature range. Texas Instruments' TC-⅛ Sensitor has been used in this application. Thus $e_3$ is proportional to $$\frac{P_{u2}}{\sqrt{\theta}} f\left(\frac{P_d}{P_{u1}}\right) E_R$$

Figure 9:
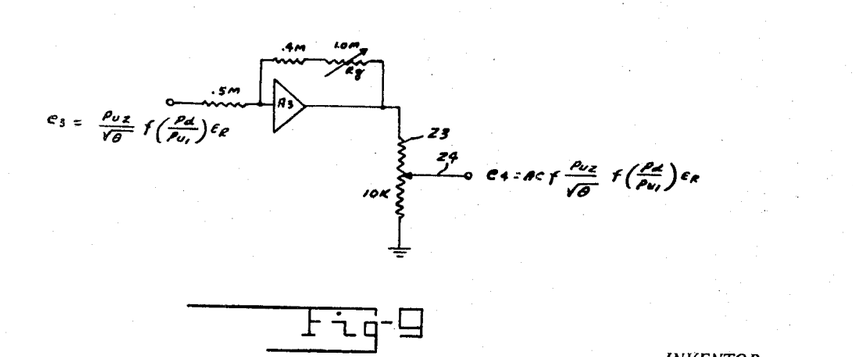
FIG. 9 shows the second multiplication circuit of the device of FIG. 1.
Figure 12:
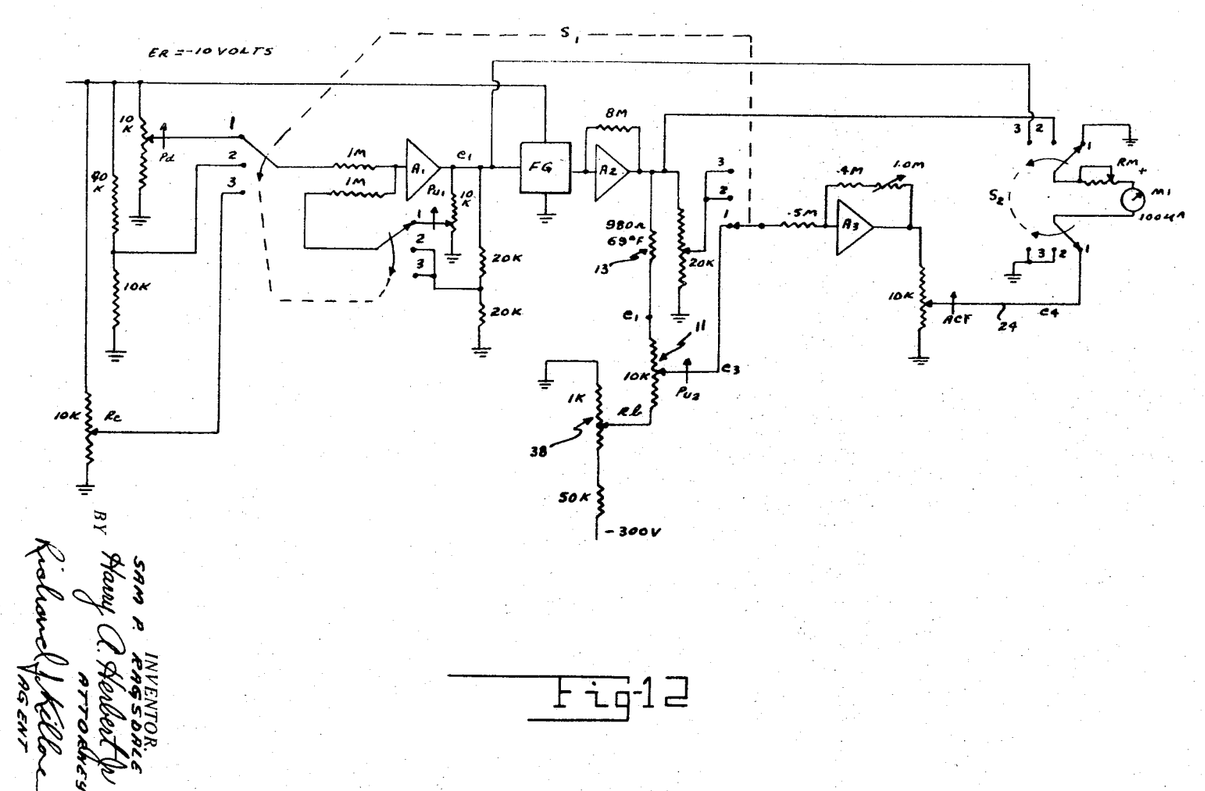
FIG. 12 is a circuit schematic partially in block form for the gas weight flow computer of FIG. 1.

As shown in FIGS. 9 and 12, the voltage $e_3$ is applied to a potentiometer 23 through an amplifier $A_3$, which may also be of the type shown in FIG. 5. Potentiometer 23 would normally be a precision 10-turn potentiometer with dial. The dial is divided into 100 increments per turn, making it possible to set to within one unit out of 1000. Since the loading on potentiometer 23 is negligible, the mathematical value of the measured area of the restriction times $C_f$ is set by turning the dial to this number. For example, if $AC_f = .241$, this would be two turns of the dial plus 41 increments of the third turn. If $AC_f$ were greater than 1, then $AC_f/10$ could be set and the 10-factor would be included in the gain of amplifier 3. Where the area A of the restriction is not fixed but varies such as in the case of a valve the area potentiometer slider 24 may be geared to the valve.

Thus, the output $e_4$ is proportional to $$C_f K \frac{P_{u2} A}{\sqrt{\theta}} f\left(\frac{P_d}{P_{u1}}\right)$$

The manner in which K is inserted has not been described, however, this will be covered in the description of the calibration of this device.

Figure 10:
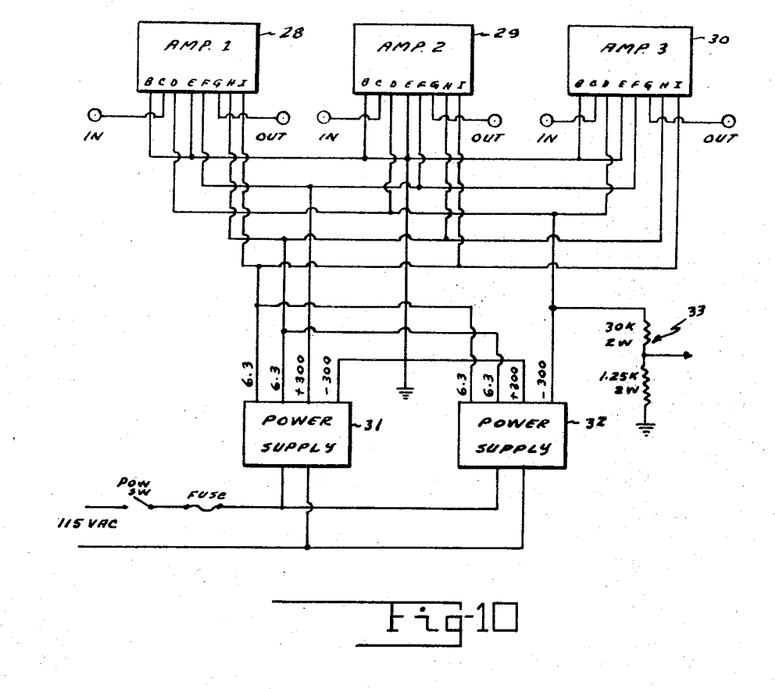
FIG. 10 shows a block diagram for the power supply connections for the device of FIG. 1.
Figure 11:
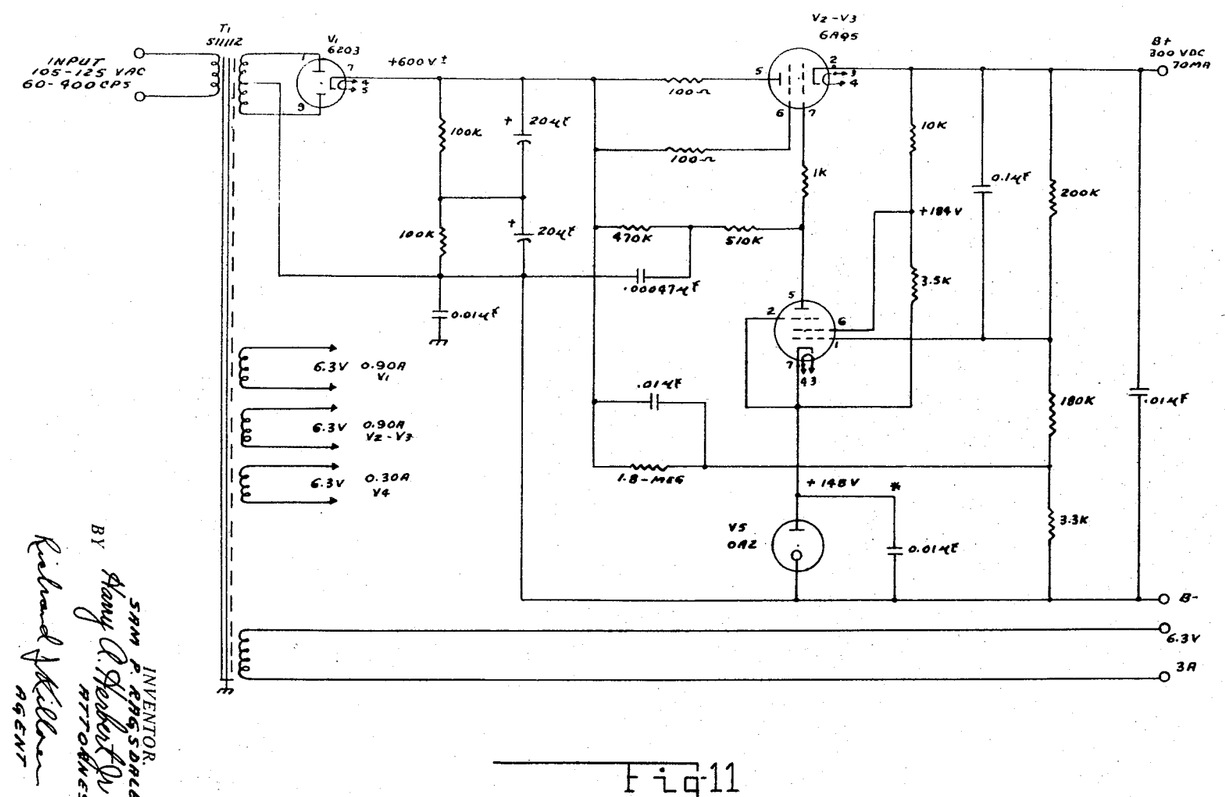
FIG. 11 shows a circuit schematic for a power supply which may be used with the device of FIG. 10.

Power for the computer is provided as shown in FIG. 10. Two Dressen-Barnes Model 22-104 power suppliers 31 and 32, for which the circuits are shown in FIG. 11, are connected to amplifiers $A_1$, $A_2$ and $A_3$ in the manner shown in block form in this figure. The letters in the blocks 28, 29, 30 in FIG. 10 correspond to the corresponding letters on the power leads of he amplifier in FIG. 5. The filament circuit connected at H and I is not shown in FIG. 5. Since three such amplifiers are used each of these will have the same corresponding connections. The voltage $E_R = -10$ volts is provided by means of a voltage divider 33, connected to the output of the negative regulated voltage supply 32 to provide a substantially fixed value of $E_R$. Though not shown specifically in this figure, the chassis of the amplifiers is connected to ground.

The calibration of the device of the invention will be explained with respect to FIG. 12 wherein the pressure transducers and temperature sensor appear in the circuit to make the explanation more complete and simpler. Also shown in this figure are a calibration switch $S_1$ and a meter switch $S_2$. Position 1 of switch $S_1$ shows the normal operating position. Position 2 is for calibration of the computer as will be explained later. Position 3 provides for a simulated $P_d$ pressure variable by adjustment of $R_C$. Position 3 makes it possible to provide various simulated pressure ratios for the computer. In positions 2 and 3 of switch $S_1$, a trimpot 35 is connected in the circuit for use in the calibration.

Switch $S_2$ is for connecting the meter for normal operation in position 1, to the output of the function generator in position 2 and the input of the function generator in position 3.

With switch $S_1$ in position 2 and $S_2$ in position 2 the computer is ready for calibration. A pressure ratio of .4 is simulated electrically. This corresponds to a condition of choked flow for which the output of the function generator is $E_R$ term is canceled from all of the transfer function.

The next step in setting up the computer is to calibrate the function generator for the ratio function of the gas being measured. Switch $S_1$ would be turned to position 3 so that the input to the function generator can be varied. The break points have been shown to be at .6, .7, .8, and .9 $E_R$. The value of $$f\left(\frac{P_d}{P_u}\right)$$

at these points would be determined and set by adjusting the appropriate slope controls ($R_1$, $R_2$, $R_3$ and $R_4$). As explained above the output and input of the function generator can be read on $M_1$ by switching $S_2$ between position 2 and position 3.

Then, after setting the dial on potentiometer 23 for the proper air flow coefficient and area, the only calibration step left is to set the gain of amplifier 3, which automatically inserts the constant K into the computer. This is done by setting the trimpot to simulate calibration conditions for transducer $P_{u2}$ and the temperature sensor.

Suppose the computer is to be calibrated for 2 lb./sec. full scale air flow with the function generator already set. Also, suppose the restriction area is .2 sq. in., $C_f = 1$ and the temperature at which to calibrate is 69° F.

$$W = K \frac{P_u A}{\sqrt{\theta}} \quad (17)$$

$$\theta = 460 + 69 = 529° \text{ R.} \quad (18)$$

$$\sqrt{\theta} = 23 \quad (19)$$

From the table in Col. 3 K for air $= .53$ so that Equation 17 is:

$$W = \frac{.53 P_{u2} .2}{23} = 2 \quad (20)$$

$$P_{u2} = 434 \quad (21)$$

This is the pressure necessary to drive 2 lbs./sec. of air through .2 sq. in. of area at 69° F. With a 3000 p.s.i.g., 10,000 ohm potentiometer pressure transducer, the wiper would be set at $$\frac{434 - 14.7}{3000} \times 10{,}000 = 1397 \text{ ohms} \quad (22)$$

up from the ground end of the potentiometer.

In terms of the fractional part of the total resistance that is $$\frac{1397}{10{,}000} = .1397$$

However, the pressure potentiometer $P_{u2}$ has the temperature in series with it which has a resistance of 980 ohms at 69° F. so that the fractional setting of the trimpot should be $$\frac{1397}{10{,}000 + 980} = .127$$

A laboratory type of Wheatstone Bridge may be used for setting the trimpot.

After the trimpot is set it is connected as shown in FIG. 12. Switch $S_1$ is put in position 2 and switch $S_2$ in position 1 and $R_g$ is adjusted to set the gain of amplifier 3 to give full scale reading on the meter.

A trim adjustment resistor 38 is provided at the bottom of $P_{u2}$ to correct for end resistance in the pressure transducer $P_{u2}$, since some pressure transducers have a slight resistance at zero pressure. To make this adjustment $S_1$ is put in position 1 and $S_2$ is left in position 1. Resistor 38 is then adjusted for zero reading on the meter.

With switches $S_1$ and $S_2$ both placed in position 1 the computer is ready for operation.

While the calibration has been described with respect to air the computer may be similarly calibrated of other gases.

There is thus provided a device for providing an on-the-line solution to the gas weight flow equation.

While certain specification embodiments have been described in detail, it is obvious that numerous changes may be made without departing from the general principle and scope of the invention.

I claim:

1. A device for providing the ratio of two pressures, comprising a first potentiometer-type pressure transducer having one end connected to a power supply, a second potentiometer-type pressure transducer having one terminal connected in common with the other end of said first pressure transducer, a pair of substantially equal resistance elements connected between the movable contact of said pressure transducers, a high gain amplifier having a substantially infinite input impedance and substantially zero output impedance connected between the junction of said pair of resistance elements and the other end of said second pressure transducer.

References Cited

UNITED STATES PATENTS

| | | | |
|---|---|---|---|
| 3,096,434 | 7/1963 | King | 235—151.34 |
| 3,097,527 | 7/1963 | Davis et al. | 235—151.34 |

MALCOLM A. MORRISON, *Primary Examiner.*

JOSEPH F. RUGGIERO, *Assistant Examiner.*

U.S. Cl. X.R.

235—196